(12) United States Patent
Barker-Mill

(10) Patent No.: US 7,197,925 B2
(45) Date of Patent: Apr. 3, 2007

(54) WIND INDICATOR

(75) Inventor: Jude Barker-Mill, London (GB)

(73) Assignee: Jude Baker-Mill

( * ) Notice: Subject to any disclaimer, the term of this patent is extended or adjusted under 35 U.S.C. 154(b) by 0 days.

(21) Appl. No.: 10/505,893

(22) PCT Filed: Feb. 26, 2003

(86) PCT No.: PCT/GB03/00835

§ 371 (c)(1),
(2), (4) Date: Apr. 8, 2005

(87) PCT Pub. No.: WO03/073109

PCT Pub. Date: Sep. 4, 2003

(65) Prior Publication Data

US 2005/0178194 A1  Aug. 18, 2005

(30) Foreign Application Priority Data

Feb. 27, 2002  (GB) ................. 0204612.6

(51) Int. Cl.
*G01P 13/02* (2006.01)
*B63B 49/02* (2006.01)

(52) U.S. Cl. ............. 73/170.03; 73/170.01; 73/170.02; 73/170.04; 73/170.05; 73/170.06; 73/170.07; 73/170.08; 73/170.09; 73/170.1; 73/170.11; 73/170.12; 73/170.13; 73/170.14; 73/170.15

(58) Field of Classification Search ..................
73/170.01–170.015, 170.03, 170.05
See application file for complete search history.

(56) References Cited

U.S. PATENT DOCUMENTS

| 2,363,087 A |   | 11/1944 | Salisbury |          |
|-------------|---|---------|-----------|----------|
| 4,488,431 A |   | 12/1984 | Miga      |          |
| 4,522,069 A | * | 6/1985  | Birnbaum  | 73/170.03|
| 4,597,287 A | * | 7/1986  | Thomas    | 73/170.03|
| 5,811,673 A | * | 9/1998  | Kwok et al.| 73/170.05|

FOREIGN PATENT DOCUMENTS

EP  0 140 813 A  5/1985

* cited by examiner

*Primary Examiner*—Michael Cyran
*Assistant Examiner*—Punam Patel
(74) *Attorney, Agent, or Firm*—Sughrue Mion, PLLC

(57) ABSTRACT

Wind indicator apparatus for indicating air flow comprising: a direction pointer, including a vane member, for providing a visible indication of air flow direction; pivoting means including a fixed portion for coupling to a sailing craft and a pivotable portion able to pivot with respect to said fixed portion and with which said direction pointer is entrained for movement therewith; and a counterbalance extending from said pivotable portion of said pivoting means and arranged to move therewith, the mass of the counterbalance being disposed so as to maintain the direction pointer in a substantially level position.

11 Claims, 4 Drawing Sheets

WIND INDICATOR

The present invention relates to apparatus for determining and indicating wind direction. In particular, but not exclusively, the invention relates to an apparent wind indicator for indicting prevailing airflow close to a sailing craft.

It is well known that on many occasions it is advantageous to be able to determine the direction of airflow in an environment. The skilled person will understand that airflow will be the result of both wind and airflow caused by movement of a craft or vehicle. This airflow component will become greater as the velocity of movement increases. The resultant airflow is the prevailing airflow. The prevailing airflow causes an effect equivalent to an apparent wind. This apparent wind will be associated with a corresponding wind direction as will also be understood by those skilled in the own.

Many devices have been disclosed in the prior art for determining apparent wind direction. In addition to determining the apparent wind direction it is often advantageous to be able to display this direction clearly and visibly so that a human being can simply detect, by looking at the apparent wind detector, in which direction the apparent wind is coming from.

Apparent wind detectors are of particular use in the fields of marine crafts this is because apparent winds can have a substantial effect upon the movement of these craft through the water. The effect is particularly pronounced when sailing craft are used. These are marine vessels which include sails. In such craft it is particularly useful for sailors to be able to see in which direction airflow is occurring in a region around the craft and particularly when sudden direction changes occur.

Apparent wind indicators are known for use with such sailing craft. However a further problem with such indicators is that as the sailing craft moves on the surface of the sea it can pitch, roll or yaw according to the waves or other conditions on the sea. This is particularly a problem in very windy conditions when the waves on the sea can toss the vessel in many directions. Under these circumstances the ability to be able to determine and display current wind direction is very important. However under these conditions an apparent wind indicator can be hindered by the fact that the sailing craft is not kept level. As a result parts of the wind indicator fixed to the ship tend to move from a horizontal position, that is horizontal with the horizon, as the craft itself is tossed. This can make the process of identifying the apparent wind direction difficult for sailors on board such a vessel.

U.S. Pat. No. 4,314,477 discloses a wind direction indicator for a sail boat which can be attached to a sail boat and which ensures that an arrowhead indicator maintains a level position as the ship rolls. However the wind direction indicator does not allow for pitching motion of the vessel. When such motion occurs the arrowhead can be fouled so that wind direction ascertainment is precluded or else the arrowhead pointer moves from the horizontal position making an angle with the horizon. This makes reading of the wind direction less accurate and more time consuming.

It is an aim of embodiments of the present invention to at least partly mitigate the above-referenced problems.

According to a first aspect of the present invention there is provided Wind indicator apparatus for indicating air flow comprising: a direction pointer, including a vane member, for providing a visible indication of air flow direction; pivoting means including a fixed portion for coupling to a sailing craft and a pivotable portion able to pivot with respect to said fixed portion and with which said direction pointer is entrained for movement therewith; and a counterbalance extending from said pivotable portion of said pivoting means and arranged to move therewith, the mass of the counterbalance being disposed so as to maintain the direction pointer in a substantially level position.

According to a second aspect of the present invention there is provided An apparent wind indicator, for indicating the direction of air flow, comprising: a support arranged for securing to a mast head of a sailing craft; pivoting means comprising a ball and cup portion arranged at an end portion of said support; a direction pointer, including a vane means coupled to the ball portion of said pivoting means and arranged for movement therewith and to point in the direction of prevailing air flow; and a counterbalance extending downwardly from the ball portion of said pivoting means whereby said direction indicator remains substantially horizontal whether the craft yaws, pitches or rolls.

Embodiments of the present invention have the advantage that, regardless of an angle of motion of the sailing craft, the direction pointer remains substantially level with the horizon. This provides a clearly visible indicator for sailors of the sailing craft to determine apparent wind direction.

Embodiments of the present invention also have the advantage of being able to determine wind direction regardless of the angle of attack of the sailing craft to the prevailing airflow conditions.

Embodiments of the present invention also provide the advantage of simple construction and easy maintenance which reduce costs.

For a better understanding of the present invention reference will now be made, by way of example only, to the accompanying drawings in which.

In the drawings like reference numerals refer to like parts.

Figure 1:
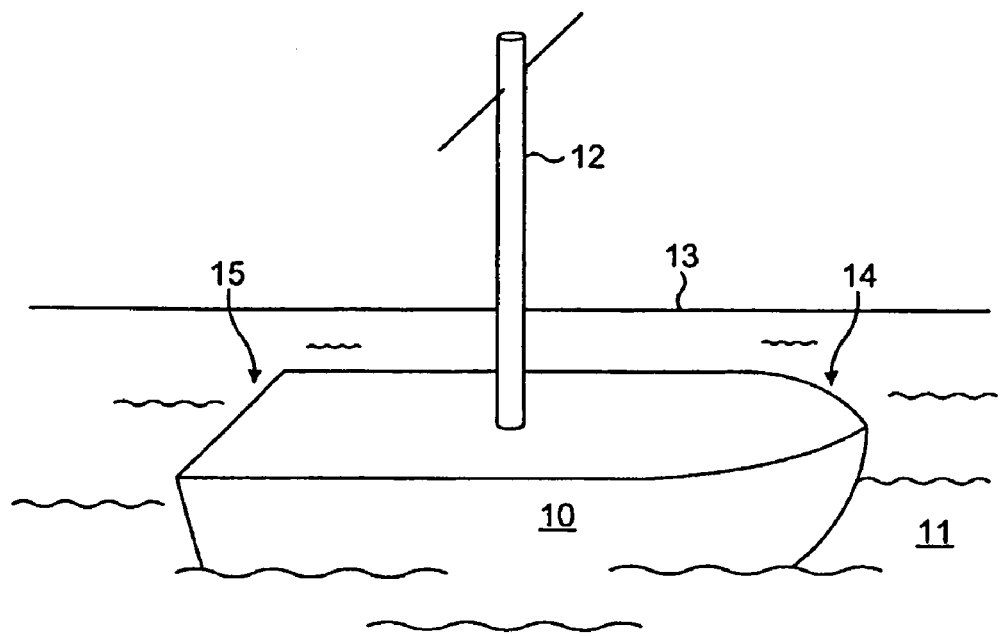
FIG. 1 illustrates a sailing craft.

FIG. 1 illustrates a sailing craft 10. It will be understood that the invention is not limited to use with sailing craft but rather could be used where wind direction indication is required for a body which can itself have many degrees of motion. Preferred embodiments of the present invention can be used with yachts, dingys, sail boats, oil tankers, frigates or any other maritime vessels.

The sailing craft 10 is shown on water 11 which may be a lake, sea, ocean or other expanse of water. The effect of the water is that the sailing craft 10 will not necessarily float in a horizontal manner but rather will pitch, yaw and roll as will be described hereinafter. The sailing craft includes a mast head 12 from which sails can depend. Also illustrated in FIG. 1 is the substantially horizontal horizon 13. It is known that sailors can determine the angle of their craft by comparing it with the substantially horizontal horizon. The sailing craft includes a bow region 14 and stern region 15.

Figure 2:
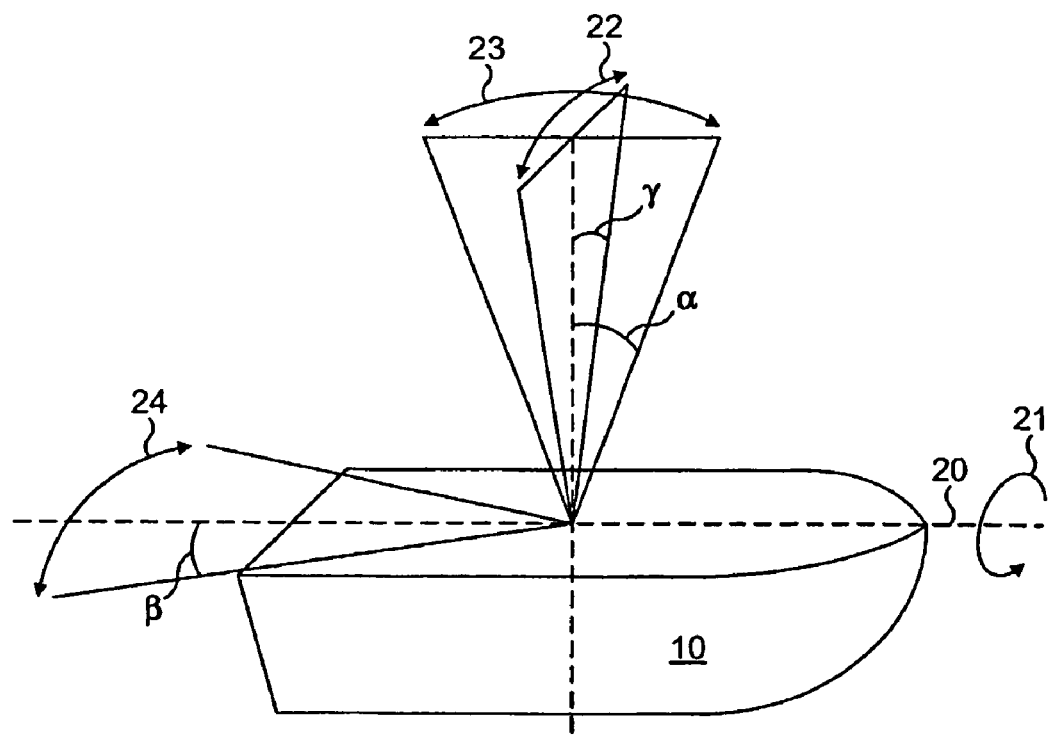
FIG. 2 illustrates possible degrees of motion of a sailing craft.

FIG. 2 illustrates possible degrees of motion of a sailing craft. Dotted line 20 illustrates a longitudinal axis through the centre of gravity of the craft 10. The craft can roll through an angle $\gamma$ and around this axis as indicated by arrows 21 & 22. A further degree of motion is illustrated by arrow 23. When the sailing craft moves as shown the craft is defined as pitching. This is indicated by pitching angle $\alpha$.

The third degree of motion is a yaw motion illustrated by arrows 24 and angle β. The effects of the sea, tides, waves and wind all conspire to move the craft on the surface of the water in any one or any combination of these degrees of motion.

Figure 3:
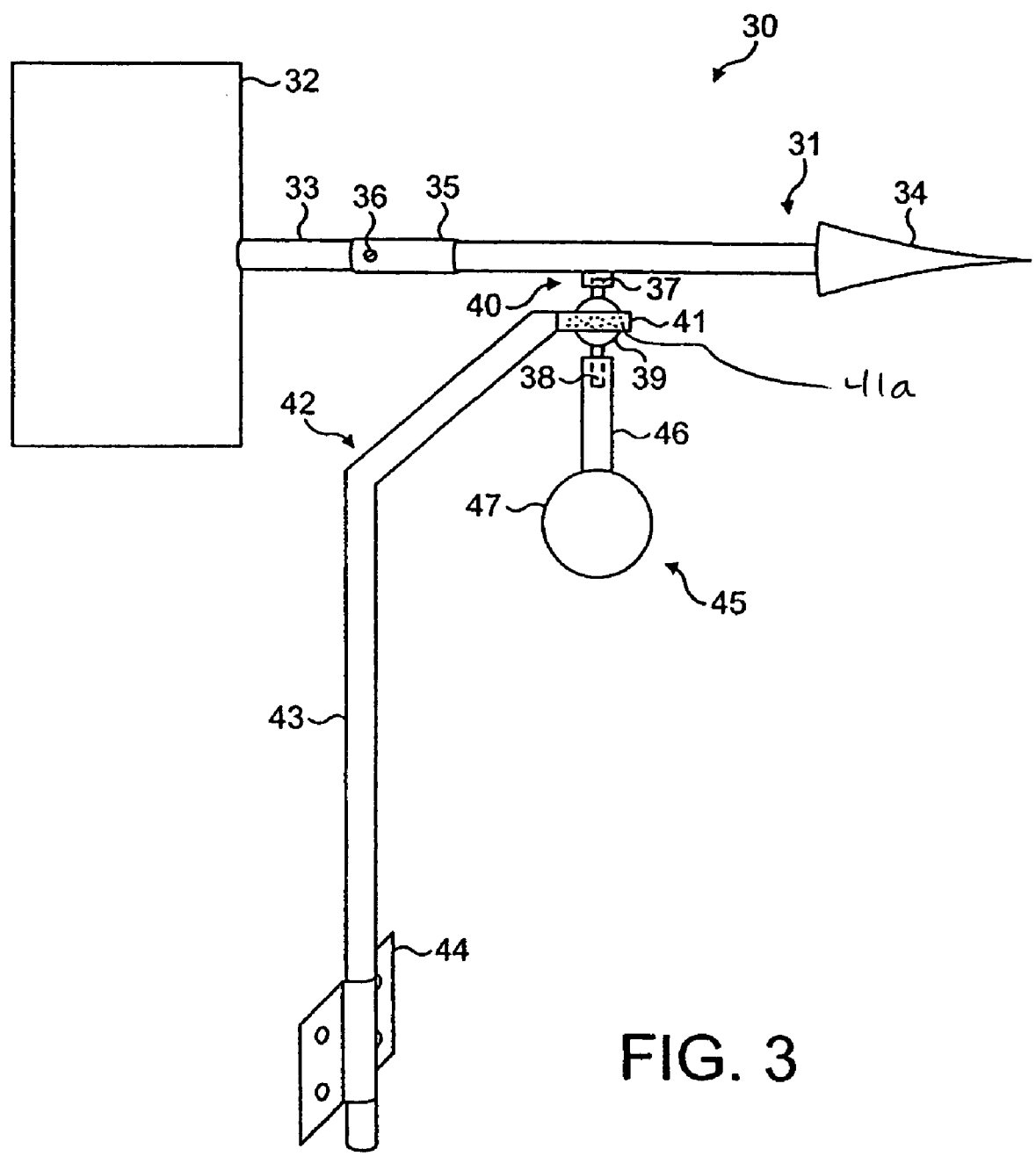
FIG. 3 illustrates an apparent wind indicator.

FIG. 3 illustrates an apparent wind indicator 30 in accordance with an embodiment of the present invention which may be fitted to the head mast or any other suitable part of a sailing craft to enable prevailing airflow on the sailing craft to be determined and indicated. It will be understood that such an apparent wind indicator could be fixed to any moveable body where wind direction was required and where the body was susceptible to movement which might hinder wind indication. It will also be understood that parts of such a wind indicator could be made integral with a part of such a sailing craft or body.

The device 30 which determines wind direction and indicates this direction includes a direction pointer 31 which itself includes a vane 32, shaft 33 and point 34. The vane member 32 comprises a surface which is caught by airflow and which turns the direction pointer into the wind about a pivot point. The shaft portion 33 is connected at one end to the vane 32 and at its other end to the point 34. It will be understood that the vane, shaft and point could be made integrally from any suitable material such as moulded plastic or aluminium. The direction pointer includes a balancing weight 35 which comprises a relatively dense metal collar which slips along the shaft 33 and which may be secured by a grub screw 36 on the shaft 33 at a location selected so as to achieve an optimum levelness for the direction pointer when fitted to a sailing craft. It will be understood that the balancing weight 35 could be secured to the shaft 33 in any suitable manner for example by a tight friction fit, by having a portion of the shaft 33 threaded so that the weight can be screwed up and down the shaft, or by any other suitable means. Also the balancing weight may be made of any suitably heavy material.

A portion of the shaft 37 extends downwardly at a region of the shaft 33. This downward extension forms a housing for a rod 38 (which is illustrated by dotted lines). The rod 38 connects the direction pointer 31 to a ball bearing portion 39 of a ball and cup joint 40. The ball and cup joint 40 also includes a cup portion 41. The ball 39 is arranged so as to be able to run smoothly within the cup 41. This is either achieved by having a very close fit for the ball in the cup or by providing a ball bearing race 41a on the inside of the cup 41; or any other suitable method. The cup 41 may take the form of a ring having an inner periphery of a size and shape which matches the outer circumference of the ball 39.

The cup 41 of the ball and cup joint 40 is connected to a forwardly extending portion 42 of a support 43. This support 43 may be attached to a mast head 12 of a sailing craft by securing means 44. It will be understood that any suitable securing means could be used for securing the support 43 to a mast head. Alternatively the support 43 and extending portion 44 could be made integrally with a portion of mast head. It will also be understood that the support 43 and securing means could be made of any particular configuration to enable the apparent wind indicator to be fixed to any other object.

The apparent wind indicator 30 also includes a counterbalance 45 which includes a rod portion 46 and spherical mass 47. The rod portion 46 acts as a support for the weight 47. It will be understood that the counterbalance may take any form which produces a suitable centre of gravity below the direction pointer 31. It is particularly advantageous for the counterbalance to act as a pendulum.

In this way the direction pointer 31 is connected via housing 37 and rod 38 to an upper pole region of the ball 39 whilst the counterbalance 45 extends via the support 46 and rod 38 to a lower pole region of the ball 39. The rod 38 extends from the housing 37 through the ball 39 and into the support 46 for the mass 47. It will be understood that the present invention is not limited to the connection of these elements in this manner. Rather any alternative such as integral manufacture would suffice so long as the direction pointer 31, ball 39 and counterbalance 45 move as an integral unit and may move freely within a fixed portion which may be fixed relative to a sailing craft or other object.

Figure 4:
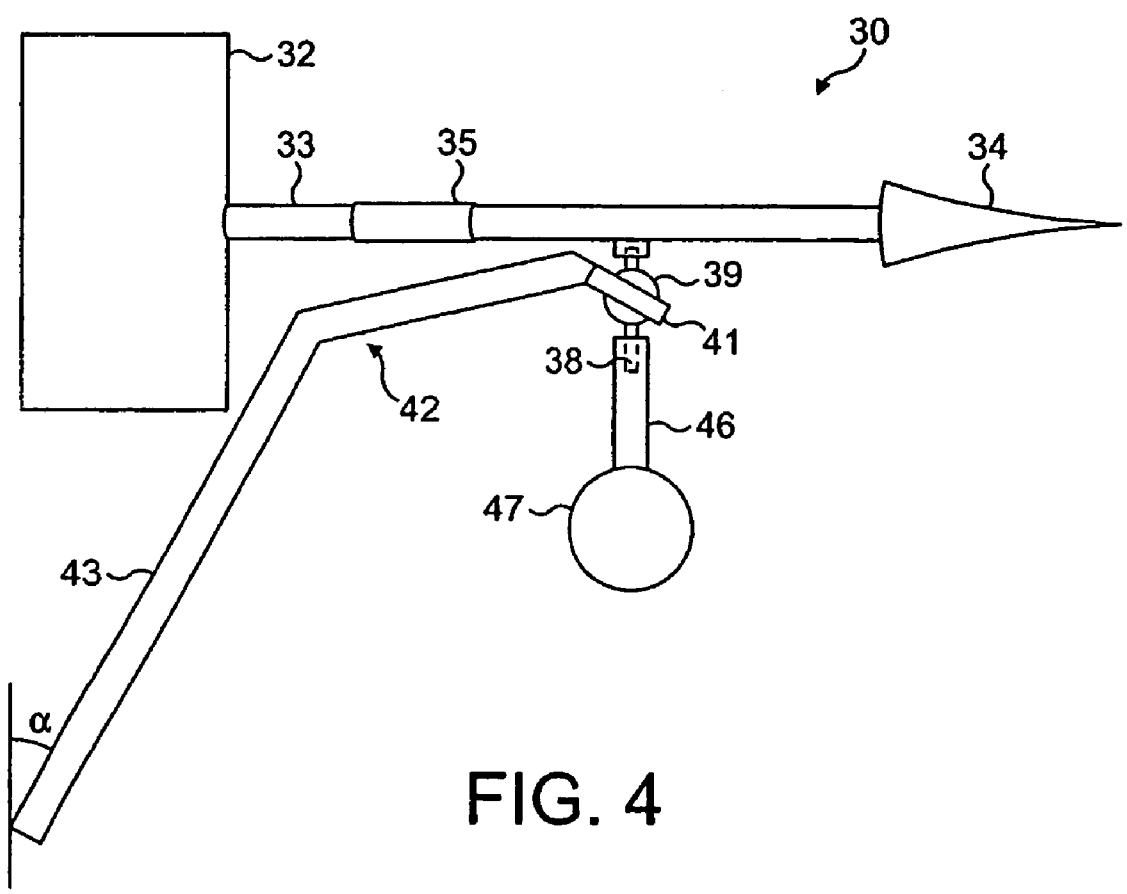
FIG. 4 illustrates an apparent wind indicator fixed to a downwardly pitching sailing craft.

FIG. 4 illustrates how the apparent wind indicator 30 maintains a substantially level position when attached to a mast head 12 of a sailing craft which pitches through an angle α. As the sailing craft pitches through this angle the support 43 pitches a corresponding angle. This moves support portions 43 and 42 and the cup 41 of the ball and cup joint 40. However as the support moves, the ball 39 slips within the cup 41 due to the counterbalance 45 which, due to the force of gravity, maintains the rod 38 in a substantially vertical position. The direction pointer 31 which is fixed substantially perpendicular to the axis running through the housing 37, ball 39 and support 46 for the counterbalance 45, is thus kept substantially horizontal. It will be understood that the possible angles through which a sailing craft may safely pass without sinking are limited. The angle of the forwardly extending section of the support 42 and dimensions of the vane 32 are selected to be able to cope with all such possible angles without becoming entangled. For example if greater angles are to be expected the portion of the vane 32 shown in FIG. 4 with dashed lines, may be removed. Alternatively a further configuration of vane 32 may be made as will be understood by those skilled in the art. It would also be possible to extend the housing portion 37 connecting the ball 39 to the direction pointer 31 so as to give more clearance from the support 42 and 43.

Figure 5:
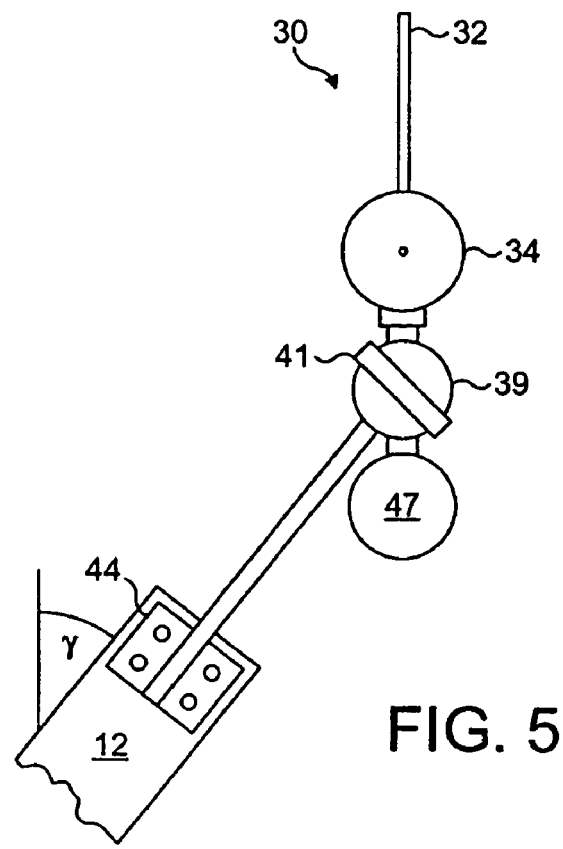
FIG. 5 illustrates an apparent wind indicator fixed to a rolling sailing craft.

FIG. 5 illustrates how the apparent wind indicator 30 operates when the sailing craft rolls. The apparent wind indicator is secured to mast head 12 via securing means 44. The cup portion of the pivoting means 40 is fixed to the support 43 and thus is fixed in position relative to the mast head. As the craft rolls through angle γ the fixed cup portion likewise moves. However the ball portion 39 of the pivoting means rolls within its joint due to the forces exerted by the counterbalance 47. This force is due to the gravitational effects on the mass of the spherical ball 47. It will be understood that any shape mass would suffice. Since the ball can roll and rock and twist within the confines of the cup, the direction pointer is maintained in a substantially horizontal position. A sailor on the sailing craft 10 would thus be able to easily check the apparent wind direction even though the vessel was tilting quite substantially.

Figure 6:
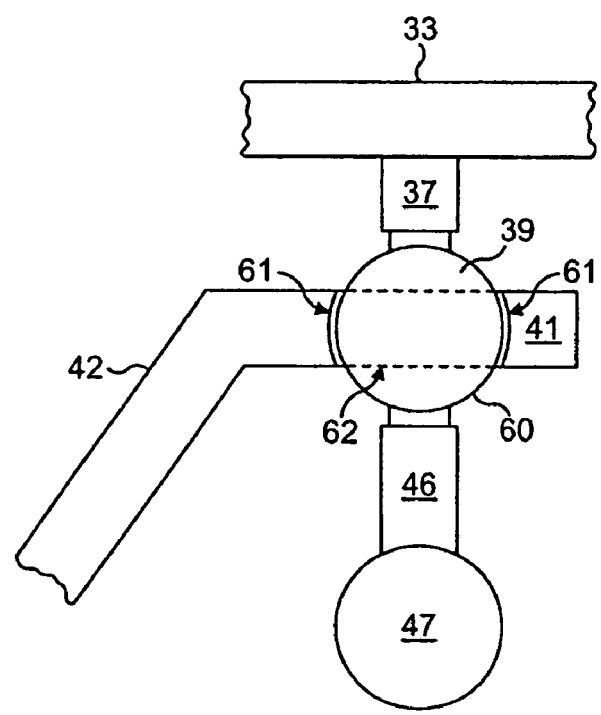
FIG. 6 illustrates a pivoting ball and socket joint.

FIG. 6 illustrates the pivoting ball and socket joint of the wind indicator apparatus in more detail. The ball and socket joint comprises a first fixed joint part 41 which forms a joint cup, and comprises a second joint part 39 which has a spherical surface 60 which is mounted in the joint cup such that it can slide. The sliding motion results from the close contoured fit of the inside surface 61 of the cup portion. It will be understood that as one of many alternatives a race could be provided on the inner surface of the cup portion 41 so as to confine the ball but allow it to slide substantially freely. The ball 39 is arranged centred at the centre of curvature of the joint cup.

The fixed portion 41 can form an end portion of the forwardly extending support 42 or can be fixed to the forwardly extending portion as is known in the art. The dotted lines 62 illustrate that the cup portion surrounds the ball 39. It will be understood that the ball 39 can thus pivot (or slide) within the cup portion. The pivoting can be a rocking motion or a turning motion about the imaginary longitudinal axis through the centre of the mast 47 along rod 46 through the centre of mass of the ball 39 and through into housing 37. The direction pointer can thus turn around this axis. Alternatively the ball can rotate within the cup portion to accommodate forward and backward and side to side motion.

It will be understood that as the sailing craft yaws the mast head or other portion to which the apparent wind indicator is affixed will move therewith. However the counterbalance will operate to maintain the pointer in a substantially level position whilst the fixed portion of the pivoting means will move relative thereto due to its fixed relationship with the mast head. The direction pointer can still turn into the wind, by rotating about the longitudinal axis of the rod 38. This is because the ball 39 can rotate within the fixed housing 41.

It will be noted that whilst the above describes preferred embodiments of the invention, variations and modifications may be made without departing from the scope of the present invention.

The invention claimed is:

1. Wind indicator apparatus for indicating air flow comprising:
    a direction pointer, including a vane member, for providing a visible indication of air flow direction;
    pivoting means including a fixed portion for coupling to a sailing craft and a pivotable portion able to pivot with respect to said fixed portion and with which said direction pointer is entrained for movement therewith; and
    a counterbalance extending from said pivotable portion of said pivoting means and arranged to move therewith, the mass of the counterbalance being disposed so as to maintain the direction pointer in a substantially level position;
    wherein said pivoting means comprises a ball and cup joint in which said fixed portion comprises a cup member and said pivotable portion comprises a ball member arranged to roll within the cup member, the cup member comprising a ring having an internal profile matched to the shape of the outer circumference of the ball member, said ring being horizontal in the neutral position.

2. The apparatus as claimed in claim 1 wherein the direction pointer is disposed at an upper pole portion of the ball member and the counter balance extends from a lower pole portion of the ball member, a line between the three points of the upper pole, centre of the ball member and lower pole defining an axis of rotation about which the direction pointer can rotate.

3. The apparatus as claimed in claims 1 or 2 wherein said cup member includes a further race member comprising a plurality of ball bearings arranged around the periphery of said ring so as to entrap the ball member and yet allow the ball member to roll within the cup member.

4. The apparatus as claimed in claim 1 further comprising:
    a support arranged for securing to said sailing craft, said support extending from the fixed portion of said pivoting means; whereby
    when said support is secured to the sailing craft, the fixed portion of the pivotable means is fixed in position relative to the sailing craft.

5. The apparatus as claimed in claim 4 wherein said support comprises a forwardly extending bracket portion connected to said fixed portion of the pivoting means.

6. The apparatus as claimed in claim 1 wherein said direction pointer comprises a shaft member having the vane member disposed at a first end thereof and a head member disposed at the further end of the shaft member, said head member providing a visible cue for determining air flow direction.

7. The apparatus as claimed in claim 6 wherein said shaft member further comprises a balancing weight which is moveable along the length of at least a portion of the shaft member, and which is securable at a selected location to thereby finely adjust the levelness of said direction pointer when mounted to the sailing craft.

8. The apparatus as claimed in claim 1 wherein said counterbalance comprises:
    a rod portion extending away from a lower portion of the pivotable portion of the pivoting means; and
    a spherical mass disposed at a region of said rod portion distal from said pivoting means.

9. The apparatus as claimed in claim 1 whereby said direction pointer remains substantially level whether the sailing craft yaws, pitches and/or rolls.

10. The apparatus as claimed in claim 1 wherein said apparatus comprises an apparent wind indicator for determining and indicating the direction of prevailing air flow in a region proximate to said wind indicator.

11. An apparent wind indicator, for indicating the direction of air flow, comprising:
    a support arranged for securing to a mast head of a sailing craft;
    pivoting means comprising a ball and cup portion arranged at an end portion of said support; the ball and cup portion comprising a cup member and a ball member and the cup member comprising a ring having an internal profile matched to the shape of the outer circumference of the ball member, said ring being horizontal in the neutral position;
    a direction pointer, including a vane means coupled to the ball portion of said pivoting means and arranged for movement therewith and to point in the direction of prevailing air flow; and
    a counterbalance extending downwardly from the ball portion of said pivoting means whereby said direction pointer remains substantially horizontal whether the craft yaws, pitches or rolls.

* * * * *